Patented Jan. 4, 1944

2,338,516

UNITED STATES PATENT OFFICE 2,338,516

THIANTHRENE VAT DYESTUFFS AND A PROCESS OF PRODUCING THE SAME

Walter Kern, Sissach, Paul Sutter, Basel, and Richard Tobler, Riehen, Switzerland, assignors to Society of Chemical Industry in Basle, Basel, Switzerland No Drawing. Application October 2, 1941, Serial No. 413,368. In Switzerland September 19, 1940

3 Claims. (Cl. 260—327)

The present invention is concerned with new vat dyestuffs and a process for producing the same. According to this invention, heterocyclic carboxylic acids incapable of being vatted which contain at least one six-membered heterocyclic ring, the said ring containing at least one of the atoms sulfur and oxygen as hetero atoms, are reacted with vattable compounds containing amino groups, such reaction being conveniently carried out with functional derivatives capable of reaction of the said heterocyclic carboxylic acids.

The heterocyclic carboxylic acids serving as starting material for this process may possess one or several, for instance two carboxylic groups. The heterocyclic ring system which bears the carboxylic groups, which is not capable of being vatted, may consist of several, for instance three and more condensed rings. At least one of them must be a six-membered heterocyclic ring with sulfur or oxygen or both contained therein as hetero atoms.

This can be accomplished in various ways. For instance two carbocyclic, preferably aromatic rings or ring systems, such as benzene or naphthalene nuclei, may be interconnected or intercondensed by a six-membered heterocyclic ring containing sulfur and/or oxygen. Sulfur may be present in the heterocyclic ring as bivalent atom or possessing higher valencies such as in the form of sulfoxide or sulfone

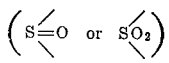

As examples of such ring systems the following may be cited:

Thianthrene

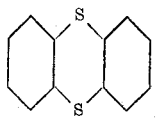

Thianthrenemonosulfoxide

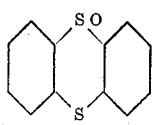

Thianthrenedisulfone

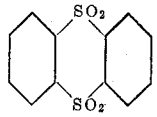

Thioxanthone

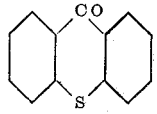

Phenoxthine

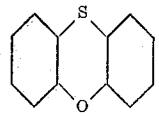

Diphenylenedioxide

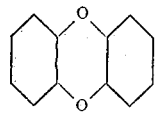

Xanthone

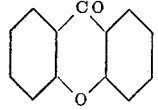

as well as those bodies which differ therefrom by condensed-on rings such as benzene rings, further those in which a —CO— group is replaced by —CH₂—.

The above examples are intended to illustrate the present invention without limiting it in any way. Besides the above symmetrical ring systems asymmetrical ones are suitable as well, wherein only one carbocyclic ring is condensed with a six-membered heterocyclic ring, or even no carbocyclic ring is present, wherein further one or more carbocyclic rings are partially or completely hydrogenated or contain further hetero atoms. Besides sulfur and/or oxygen other hetero atoms may be present as well. Therefore the following examples may further be given: benzodioxine, 1:4-dithiine, pyrane, benzo- and naphthopyranes, benzo-1:4-thiazine, thiodiphenylamine, phenoxazine, as well as their benzo- or dibenzo derivatives.

The prescription that the said carboxylic acids must be incapable of being vatted, means that their basic heterocyclic compounds are non-vattable, and particularly means that the latter are free from such cyclic bound carbonyl groups which are interconnected by conjugated double bonds such as are found in anthraquinone and most of its derivatives or in indigoid dyes.

The carboxylic acids mentioned above are mostly new. Generally they may be obtained from the corresponding basic compounds by halogenating, particularly brominating, reacting the halogenated compounds with cuprocyanide and hydrolysing the nitriles. Besides the carboxylic acid groups required for preparing the dyestuffs of the present invention, they may contain further substituents such as alkyl-, especially methyl-, alkoxy- and nitro groups as well as halogens such as chlorine and bromine, quite generally such substituents which may be present in vat dyestuffs without detrimental effect.

By the reaction outlined above and particularly described in some of the examples, in many instances dicarboxylic acids are most conveniently obtained. By effecting suitable changes in the halogenating operation, monocarboxylic acids may be obtained as well as acids containing more than two carboxylic groups.

The vattable compounds containing amino groups which are required for the process of the present invention, are preferably selected from the anthraquinone series, this term comprising higher condensed anthraquinone derivatives (i. e. containing more than 3 rings) and anthraquinone and its substitution products. Amongst the amino-substituted higher condensed compounds those come into consideration which are built up from two or more anthraquinone or like nuclei, such as aminodibenzanthrones, aminoanthanthrones, aminoflavanthrones and aminopyranthrones or those which are derived from anthraquinone by condensing on further rings such as aminoanthrapyrimidines, aminoisothiazolanthrones, aminopyrazolanthrones, amino-1:2-anthraquinone phenylimidazoles (for instance 4-amino-1:2-(2′-chlorophenyl)-imidazolanthraquinone) and aminoanthraquinone-benzacridones. Amongst the aminoanthraquinones α-aminoanthraquinone may be particularly mentioned, further such 1-aminoanthraquinones which contain substituents such as alkoxy- (methoxy) or aroyl-(benzoyl)-groups, further amino acylaminoanthraquinones wherein the acyl residue may be derived from an aliphatic acid (acetic acid) an aromatic acid (benzoic and substituted benzoic acids) an aliphatic aromatic or heterocyclic acid (pyridine carboxylic acid).

This list of compounds, too, is not limitative but only illustrates the invention. Further vattable amino-compounds not belonging to the anthraquinone series may be used, such as amino-substitution products of indigo, thioindigo, pyrenequinone, dibenzpyrenequinone as well as similar compounds. There too substituents as are permissible in vat dyestuffs may be present.

In several instances such vattable compounds may be used which, for instance in ortho position to an amino group, contain at least one substituent which gives rise to formation of a heterocyclic ring. Such substituents are for instance the hydroxyl-, mercapto-, nitro- or amino-groups as well as halogen atoms. According to the particular conditions oxazole-, thiazole- and imidazol-rings may be formed immediately following the reaction with the carboxylic acids or their functional derivatives, or these rings may be formed in a separate step, according to generally known methods.

For carrying out the reaction with vattable compounds containing amino groups, the carboxylic acids mentioned above are used preferably in form of their functional derivatives, capable of reaction, i. e. as acid halides or acid amides. The reaction may be carried out in indifferent dispersing or dissolving agents, particularly those having a high boiling point, such as chlorobenzene, dichlorobenzenes, or nitrobenzene, at elevated temperatures for instance at the boiling point of such indifferent solvents. In certain instances room temperature or a slightly raised temperature may be more suitable. According to known methods agents capable of binding acid, agents capable of eliminating ammonia or catalytically active agents may be used. The addition of tertiary bases such as pyridine to the reaction medium has proved to be of particular advantage in many instances. If dichlorides of dicarboxylic acids are used the proportions of the reagents are preferably so chosen that all the carboxylic acid groups enter into reaction.

The products of the present invention may also be obtained in a somewhat different way by reacting the corresponding carboxylic acid amides with vattable compounds containing an exchangeable halogen atom.

The products of the present invention are vat dyestuffs and may be used accordingly for dyeing and printing the most diverse fibers of animal or vegetable origin, such as wool, silk and leather, but especially cotton, hemp, rayon and staple fibers from regenerated cellulose as well as mixtures of the aforementioned fibers. They may further be converted according to known methods into leuco sulfuric acid esters.

The present invention provides inter alia yellow dyestuffs of very pure shade possessing very good all-round fastness and especially excellent fastness to light.

The following examples illustrate the invention but are not intended to limit it in any way, the parts being by weight:

*Example 1*

1 part of finely powdered thianthrenedicarboxylic acid is dispersed in 75 parts of ortho-dichlorobenzene and after adding 6 parts of thionylchloride the whole is heated at 140–180° C. until complete conversion into the thianthrenedicarboxylic acid-dichloride has taken place. The thionylchloride in excess is removed by distillation, a boiling solution of 2.3 parts of 1–amino-5-benzoylaminoanthraquinone in 90 parts of ortho-dichlorobenzene is added and the mixture is heated to boiling for about 1 hour. It is filtered after cooling, washed at first with ortho-dichlorobenzene, then with alcohol, and dried. There is obtained a brown-red powder of the probable formula

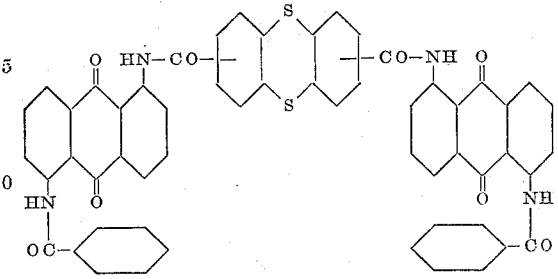

which is vatted with green-violet color and dyes cotton very fast yellow tints. The good fastness to light is particularly remarkable.

The thianthrene-dicorboxylic acid used has been prepared as follows:

216 parts of thianthrene are dispersed in 800 parts of nitrobenzene. A mixture of 336 parts of bromine and 100 parts of nitrobenzene is allowed to drop into this dispersion at room temperature. After stirring for several days at room temperature the evolution of hydrogen bromide has ceased. The whole is strongly sucked off, washed thoroughly with alcohol and dried. The product thus obtained is a white powder which dissolves in concentrated sulfuric acid to a blue solution. The analysis shows it to be a dibromothianthrene.

30 parts of the dibromothianthrene described in the preceding paragraph are dispersed with 16 parts of cuprocyanide in 100 parts of anhydrous pyridine and heated in an autoclave for 6 hours to 250-255° C. The whole is filtered after cooling, the residue is washed with alcohol, then stirred for a short time at room temperature with nitric acid of 30 per cent strength, filtered, washed and dried. These is obtained a brownish crystalline powder. The analysis shows it to be a thianthrenedinitrile.

23.4 parts of the thianthrenedinitrile described in the preceding paragraph are dispersed with 10 parts of potassium hydroxide in 600 parts of alcohol of 96 per cent strength and heated in an autoclave for 12 hours to 180-185° C. The alcohol is distilled as completely as possible, the residue is dissolved in water, boiled with some animal charcoal and filtered. The clear solution is then heated to boiling and mixed with hydrochloric acid until the reaction is acid to Congo. The thianthrenedicarboxylic acid thus precipitated is filtered, washed with water and dried. There is obtained a yellowish-white powder which is very sparingly soluble, which dissolves in concentrated sulfuric acid to a red solution.

parts of anhydrous pyridine are added and the reaction mass is thoroughly stirred for 24 hours. After filtering, washing and drying the dyestuff of the probable formula

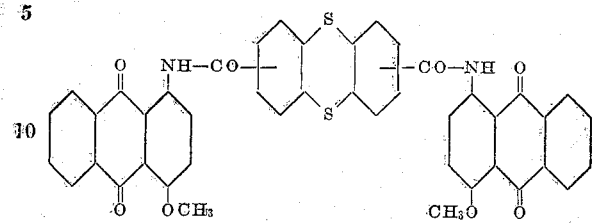

is obtained in the form of a red powder which dyes cotton fast orange tints from a red-brown vat.

The purity of the dyestuff can be improved by a subsequent treatment with Javelle water or solution of chlorinated lime.

When using the acid chloride of the same thianthrenedicarboxylic acid the following dyestuffs are obtained in analogous manner:

|    | Vattable amine | Dyestuff powder | Vat | Dyeing on cotton |
|----|---|---|---|---|
| 1  | 1-amino-4-benzoylamino-anthraquinone | Red | Blue-black | Red. |
| 2  | 1-amino-8-benzoylamino-anthraquinone | Yellow-brown | Reddish-brown | Yellow. |
| 3  | 1-amino-5-benzoylamino-8-methoxyanthraquinone | Red | Brown | Scarlet-red. |
| 4  | 1-aminoanthraquinone | Yellow-brown | Violet-brown | Yellow. |
| 5  | 2-aminoanthraquinone | ----do---- | Yellow-brown | Green-yellow. |
| 6  | 1-amino-3-benzoylanthraquinone | Yellow | Violet-black | Yellow. |
| 7  | 1-amino-3-(para'-chlorobenzoyl)-antbraquinone | ----do---- | ----do---- | Do. |
| 8  | 1-amino-5-methoxyanthraquinone | Brown-yellow | Red-brown | Green-yellow. |
| 9  | Aminodibenzanthrone | Dark | Reddish-blue | Green-blue. |
| 10 | Aminoisodibenzanthrone | ----do---- | Blue | Blue. |
| 11 | Aminopyranthrone | Black-brown | Violet-red | Green. |
| 12 | 4-amino-1:9-anthrapyrimidine | Yellow-brown | Brown | Green-yellow. |
| 13 | 5-amino-1:9-anthrapyrimidine | Brown | ----do---- | Yellow. |
| 14 | 1-amino-5-acetylaminoanthraquinone | Yellow-brown | Violet-brown | Do. |
| 15 | 1-amino-5-cinnamoylaminoanthraquinone | Brown | Black-olive | Do. |
| 16 | 1-amino-5-pyridoylaminoanthraquinone | ----do---- | ----do---- | Do. |
| 17 | 4-aminoanthraquinone-1(N),-2-benzacridone | Dark-blue | Red-violet | Blue. |
| 18 | 4-aminoanthraquinone-1(N),2:1'.2'(N)-5'-chlorobenzacridone | Green-black | Violet-brown | Green-blue. |
| 19 | 5-aminoanthraquinone-1(N)2-benzacridone | Dark | Red-violet | Brown-violet. |

*Example 2*

30 parts of finely powdered thianthrenedicarboxylic acid are dispersed in 2000 parts of ortho-dichlorobenzene and after adding 50 parts of thionylchloride the whole is heated to 140-180° C. until complete conversion into the thianthrenedicarboxylic acid-dichloride has taken place. The thionylchloride in excess is completely removed by distillation, a boiling solution of 70 parts of 1-amino-5-benzoylaminoanthraquinone and 30 parts of anhydrous pyridine in 1000 parts of ortho-dichlorobenzene is added and the mixture is heated to boiling for about 1 hour. It is filtered after cooling, washed at first with ortho-dichlorobenzene, then with alcohol, and finally with water, and dried. The dyestuff thus obtained is practically identical with the one described in Example 1.

Instead of pyridine there may be used also other acid-binding agents, for instance picoline, quinoline, dimethylaniline and the like.

*Example 3*

3 parts of finely powdered thianthrenedicarboxylic acid are dispersed in 700 parts of ortho-dichlorobenzene and after adding 16 parts of thionylchloride the whole is heated to 140-180° C. until complete conversion into the thianthrenedicarboxylic acid-dichloride has taken place. The thionylchloride in excess is completely removed by distillation and the mixture is allowed to cool at room temperature. A suspension of 5.2 parts of very finely pulverized 1-amino-4-methoxyanthraquinone in 500 parts of ortho-dichlorobenzene of room temperature and then 5

*Example 4*

3.4 parts of thianthrenedicarboxylic acid-dichloride are dispersed with 5.1 parts of 1-mercapto-2-aminoanthraquinone in 180 parts of nitrobenzene and the mixture is gradually heated to boiling while thoroughly stirring. Water and hydrochloric acid formed by the reaction are removed by distillation with some nitrobenzene, whereupon boiling is continued for 16 hours. The mass is filtered after cooling, washed with nitrobenzene and alcohol and then dried. For purpose of purification the crude dyestuff is redissolved from cold concentrated sulfuric acid and treated with hypochlorite solution. There is obtained a yellow-brown powder which dyes cotton yellow tints from a violet vat, and probably corresponds with the formula

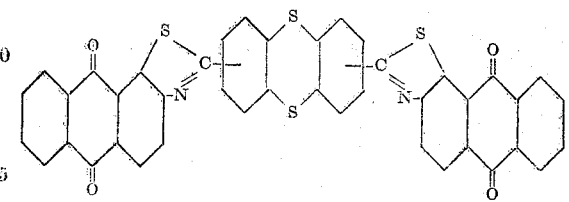

*Example 5*

2 parts of dimethylthianthrene-dicarboxylic acid are dispersed in 240 parts of ortho-dichlorobenzene and after adding 10 parts of thionylchloride the whole is heated to 140-180° C. until complete conversion into the dimethylthianthrene-dicarboxylic acid-dichloride has taken place. The thionylchloride in excess is removed by distillation, a hot solution of 4.2 parts of 1-amino-5-benzoylaminoanthraquinone in 120 parts of ortho-dichlorobenzene is added and the mixture is heated to boiling for 1 hour.

It is filtered after cooling, purified as usual and then dried. There is obtained a yellow powder in good yield which dyes cotton very fast yellow tints from a violet-red vat.

The dimethylthianthrene-dicarboxylic acid used in this example has been obtained in the following manner.

A solution of 123 parts of bromine in 480 parts of nitrobenzene is added in drops at room temperature into a solution of 85 parts of dimethylthianthrene (obtained by condensation of toluene with sulfur monochloride) and 4.2 parts of iodine in 480 parts of nitrobenzene. The mixture is stirred for 16 hours at room temperature and the temperature is then raised to 90–100° C. within 4 hours, much hydrogen bromide being evolved thereby. The whole is cooled to room temperature and 250 parts of absolute alcohol are allowed to gradually drop in, while stirring. The mixture is filtered after some time, washed with alcohol and dried. There is obtained a white product which crystallizes from benzene in colorless needles of melting point 205° C. The analysis shows it to be a dibromodimethylthianthrene.

15 parts of the dibromodimethylthianthrene thus obtained are dispersed with 7 parts of cuprocyanide in 120 parts of anhydrous quinoline and heated to boiling in 3 hours. The mixture is filtered after cooling, washed with alcohol and dried. In order to remove copper compounds the crude product is treated with cold nitric acid of 30 per cent. strength, filtered, washed with water and dried. There is obtained a brownish product which crystallizes from nitrobenzene in yellow needles of melting point 300° C. The analysis shows it to be a dimethylthianthrenedinitrile.

9.5 parts of the dimethylthianthrenedinitrile obtained as described above are heated for 8 hours in an autoclave to 180–185° C. together with 5 parts of caustic potash and 700 parts of alcohol of 96 per cent. strength. The alcohol is removed by distillation, the residue is taken up in water and the dimethylthianthrenedicarboxylic acid which has formed is precipitated with hydrochloric acid. It forms a white powder which dissolves in monohydrate to a violet solution.

*Example 6*

2 parts of the dimethylthianthrenedicarboxylic acid described in Example 5 are dispersed in 200 parts of orthodichlorobenzene and after addition of 10 parts of thionylchloride the mixture is heated to 140–180° C. until the conversion into the dimethylthianthrene-dicarboxylic acid-dichloride is complete. The thionylchloride in excess is removed by distillation, a boiling solution of 2.8 parts of 1-aminoanthraquinone in 100 parts of ortho-dichlorobenzene is added and the whole is heated to boiling for 1 hour. The mass is filtered after cooling, washed first with orthodichlorobenzene, then with alcohol and dried. There is obtained a yellow powder which dyes cotton green-yellow tints from a red vat.

*Example 7*

1 part of finely powdered thianthrene-monosulfoxidedicarboxylic acid is dispersed in 80 parts of ortho-dichlorobenzene and after addition of 5 parts of thionylchloride the mixture is heated to 140–180° C. until the formation of the dicarboxylic acid-dichloride is complete. The thionylchloride in excess is removed by distillation, a hot solution of 2.3 parts of 1-amino-5-benzoylaminoanthraquinone in 80 parts of ortho-dichlorobenzene is added and the whole is heated to boiling for 1 hour. The mass is filtered after cooling, washed in the usual manner and dried. There is obtained a red-brown powder which dyes cotton fast golden yellow tints from a red-brown vat and probably corresponds with the formula

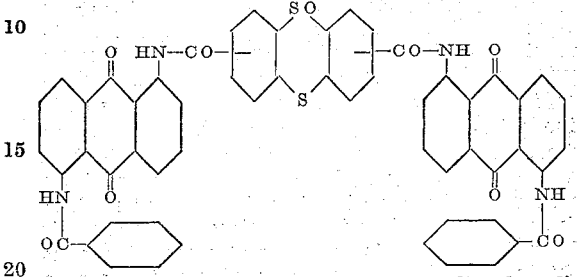

The thianthrenemonosulfoxide-dicarboxylic acid used in this example has been obtained as follows:

22.4 grams of dibromothianthrene are heated to boiling in 1 liter of glacial acetic acid. 20 cc. of nitric acid of 65 per cent strength are allowed to drop into this solution and heating to boiling is continued for 2 hours after completion of the strong reaction. The mixture is filtered after cooling, washed with glacial acetic acid and dried. There is obtained a white product which crystallizes from chlorobenzene in colorless needles of melting point 230–235° C. The analysis shows it to be a dibromothianthrenemonosulfoxide. By heating this product with cuprocyanide and pyridine thianthrenemonosulfoxide-dinitrile is obtained in the usual manner which melts at 310° C. when recrystallized from nitrobenzene. By saponification with alcoholic caustic potash and precipitation with hydrochloric acid, the thianthrenemonosulfoxide-dicarboxylic acid is obtained therefrom, which is a white powder dissolving in concentrated sulfuric acid to a red solution.

*Example 8*

1 part of thianthrenedisulfone-dicarboxylic acid is dispersed in 60 parts of ortho-dichlorobenzene and after adding 6 parts of thionylchloride the solution is converted into the thianthrenedisulfone-dicarboxylic acid-dichloride as repeatedly described. After removing the thionylchloride in excess by distillation there is added a boiling solution of 1.9 parts of 1-amino-5-benzoylaminoanthraquinone in 75 parts of ortho-dichlorobenzene and the mixture is heated to boiling for 1 hour. After cooling it is filtered, washed first with dichlorobenzene, then with alcohol and dried. There is obtained a yellow-red powder of the probable formula

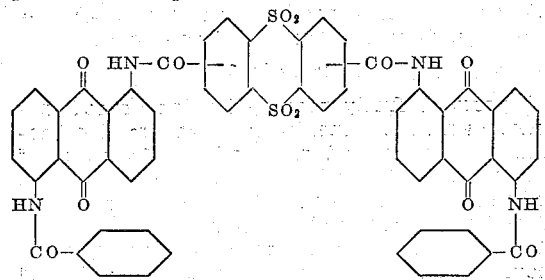

which dyes cotton from an olive-black vat yellow tints.

The thianthrenedicarboxylic acid used is obtained in the following manner:

2 parts of the thianthrenedicarboxylic acid described in Example 1 are dissolved in 500 parts of water containing 3 parts of caustic potash. 3.5 parts of potassium permanganate are gradually added to this solution at room temperature, while stirring well, the whole is heated little by little to the boil and kept boiling for 1 hour. It is filtered hot and hydrochloric acid is added until the reaction is acid to Congo, whereupon the mixture is allowed to stand for some time. After filtering, washing and drying the precipitated thianthrenedisulfone-dicarboxylic acid represents a white powder.

By condensing thianthrene with chloroacetylchloride and oxidizing the product thus obtained with sodium hypochlorite solution there is also obtained a thianthrene-disulfone-dicarboxylic acid, the dichloride of which, when condensed in the usual manner with 1-amino-5-benzoylamino-anthraquinone, produces a similar yellow dyestuff like that obtained according to the first paragraph of this example.

Example 9

5 parts of the thianthrene-disulfone-dicarboxylic acid described in Example 8 are dispersed in 200 parts of ortho-dichlorobenzene and converted into the thianthrene-disulfone-dicarboxylic acid-dichloride as described repeatedly. The thionylchloride in excess is removed by distillation, a boiling solution of 6.1 parts of 1-aminoanthraquinone is added and the whole is heated for 1 hour. After cooling the product is worked up in the usual manner. There is obtained a green-yellow powder which dyes cotton from a dark red-brown vat greenish tinged yellow tints.

By condensing 1 mol of thianthrenedisulfone-dicarboxylic acid-dichloride with 2 mols of 1-amino-4-benzoylaminoanthraquinone there is obtained a dyestuff which dyes cotton scarlet red tints from an olive-green vat.

Example 10

3 parts of finely powdered thianthrene-dicarboxylic acid are dispersed in 200 parts of ortho-dichlorobenzene and after adding 8 parts of thionylchloride the solution is converted into the thianthrene-dicarboxylic acid-dichloride as described repeatedly. The thionylchloride in excess is removed by distillation, a suspension of 3.4 parts of very finely powdered 1-amino-5-benzoylamino anthraquinone in 120 parts of ortho-dichlorobenzene and 4 parts of anhydrous pyridine are added and the whole is stirred for 3 hours at 55–60° C. A hot solution of 2.5 parts of 1-amino-4-methoxyanthraquinone in 100 parts of ortho-dichlorobenzene is added, and stirring is continued for 1 hour at 165–170° C. The mixture is filtered after cooling, washed with ortho-dichlorobenzene and alcohol and dried. There is obtained a brown-red powder which dyes cotton fast, reddish-yellow tints from a red-violet vat. It probably corresponds to the formula

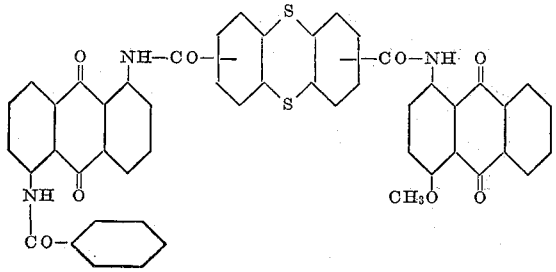

Example 11

1 part of finely powdered dimethylthianthrene-sulfoxide-dicarboxylic acid is dispersed in 100 parts of ortho-dichlorobenzene and after adding 15 parts of thionylchloride the dispersion is converted into the dichloride as described repeatedly. The thionylchloride in excess is removed by distillation, a boiling solution of 2 parts of 1-amino-5-benzoylaminoanthraquinone is added and the whole is heated to boiling for 1 hour. It is filtered after cooling and worked up in the usual manner. There is obtained a golden-yellow powder which dyes cotton yellow tints from a violet vat.

The dimethylthianthrene-sulfoxide-dicarboxylic acid used in this example has been obtained as follows:

10 parts of the dibromodimethylthianthrene described in Example 5, paragraph 3, are dissolved in 300 parts of boiling glacial acetic acid and 10 parts of nitric acid of 68 percent strength are added in drops to this solution. As soon as the violent reaction is finished, the mixture is allowed to cool, the product which has precipitated is filtered, washed with glacial acetic acid and dried. The dibromodimethylthianthrene-monosulfoxide thus obtained forms colorless needles which melt at 255° C. and are dissolved in concentrated sulfuric acid to a blue solution. By heating this product with cuprocyanide in anhydrous pyridine according to the method described in Example 1, paragraph 4, there is obtained dimethylthianthrene-monosulfoxide-dinitrile which produces dimethylthianthrene-monosulfoxide-dicarboxylic acid when saponified with alcoholic caustic potash.

Example 12

1 part of the dimethylthianthrene-monosulfoxide-dicarboxylic acid is dispersed in 100 parts of ortho-dichlorobenzene and after adding 15 parts of thionylchloride the mixture is added to 140–180° C. until the conversion into the dicarboxylic acid dichloride is complete. The thionylchloride in excess is removed by distillation, a hot solution of 1.3 parts of 1-aminoanthraquinone in 60 parts of orthodichlorobenzene is added and the whole is heated to boiling for 1 hour. The mixture is filtered after cooling, washed and dried. There is obtained a yellow powder which dyes cotton greenish tinged yellow tints from a red-violet vat.

Example 13

1 part of finely powdered phenoxthine-dicarboxylic acid is dispersed in 100 parts of ortho-dichlorobenzene and after adding 8 parts of thionylchloride the mixture is heated to 140–180° C. until the conversion into the phenoxthine-dicarboxylic acid-dichloride is complete. The thionylchloride in excess is removed by distillation, a boiling solution of 2.6 parts of 1-amino-5-benzoylaminoanthraquinone in 100 parts of ortho-dichlorobenzene is added and the whole is heated to boiling for 1 hour. The mixture is filtered after cooling, washed and dried. There is obtained a yellow-red powder which dyes cotton very fast reddish-yellow tints from a violet vat. The excellent fastness to light is particularly remarkable.

The phenoxthine-dicarboxylic acid used in this example has been obtained as follows:

20 parts of phenoxthine are dispersed in 40 parts of nitrobenzene and mixed at room temperature with 34 parts of bromine, dissolved in 25 parts of nitrobenzene, while stirring. The whole is stirred for 24 hours at room temperature, filtered, the residue is washed with alcohol and dried. The dibromophenoxthine thus obtained is a white powder which dissolves in concentrated sulfuric acid to a greenish-blue solution. By heating this product with cuprocyanide in anhydrous pyridine according to the method described in Example 1, paragraph 4, there is obtained phenoxthine-dinitrile which produces phenoxthine-dicarboxylic acid when saponified with alcoholic caustic potash. This forms a white sparingly soluble powder which dissolves in hot concentrated sulfuric acid to a brown-red solution.

Example 14

1 part of finely powdered phenoxthine-sulfone-dicarboxylic acid is dispersed in 100 parts of ortho-dichlorobenzene and after adding 8 parts of thionylchloride the mixture is heated to 140–180° C. until the conversion into the phenoxthin-sulfone-dicarboxylic acid dichloride is complete. The thionylchloride in excess is removed by distillation, a boiling solution of 2.3 parts of 1-amino-5-benzoylaminoanthraquinone in 80 parts of ortho-dichlorobenzene is added and the whole is heated to boiling for 1 hour. The mixture is filtered after cooling, washed and dried. There is obtained a yellow-brown powder of the probable formula

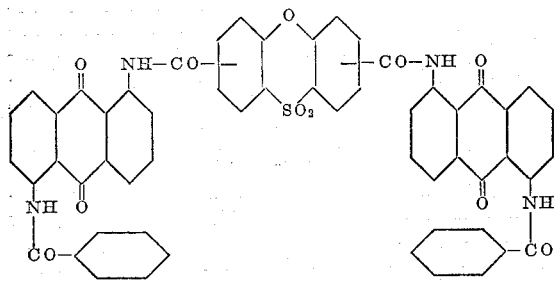

which dyes cotton powerful yellow tints from a black-violet vat.

The phenoxthine-sulfone-dicarboxylic acid used in this example has been obtained as follows:

2 parts of the phenoxthine-dicarboxylic acid described in Example 13 are dissolved in 400 parts of water containing 0.8 part of caustic potash, 1.6 parts of powdered potassium permanganate are added to this solution and the whole is stirred for 20 hours at room temperature. It is then filtered, the clear filtrate is mixed with hydrochloric acid until the reaction is acid to Congo, the precipitate which has formed is removed by filtration, washed with water and dried. The phenoxthine-sulfone-dicarboxylic acid is thus obtained as a grey-white powder which dissolves in hot concentrated sulfuric acid to a brown-violet solution.

Example 15

2 parts of finely powdered thioxanthone-dicarboxylic acid are dispersed in 150 parts of ortho-dichlorobenzene and after adding 8 parts of thionylchloride the mixture is heated to 140–180° C. until the conversion into the thioxanthone-dicarboxylic acid-dichloride is complete. The thionylchloride in excess is removed by distillation, mixed with a hot solution of 4.8 parts of 1-amino-5-benzoylaminoanthraquinone and 2 parts of anhydrous pyridine in 80 parts of orthodichlorobenzene and the whole is heated to boiling for 1 hour. The mixture is filtered after cooling, washed and dried. There is obtained a red-brown powder which dyes cotton yellow tints from a red-violet vat.

The thioxanthone-dicarboxylic acid used in this example has been obtained as follows:

17 parts of thioxanthone, 28 parts of bromine and 110 parts of nitrobenzene are heated together in an autoclave for 5 hours at 240–245° C. The whole is filtered after cooling, washed with alcohol, dried and the crude product obtained is recrystallized from chlorobenzene. Dibromothioxanthone is obtained in the form of feebly yellow needles which melt at 256° C. By heating this product with cuprocyanide in anhydrous pyridine according to the method described in Example 1, paragraph 4, there is obtained thioxanthone-dinitrile which melts at 420° C. when crystallized from nitrobenzene. By saponifying the product with alcoholic caustic potash in an autoclave at 190° C. there is obtained thioxanthone-dicarboxylic acid which is a grey-white powder forming a brown solution with concentrated sulfuric acid which fluoresces in olive-green color.

Example 16

1 part of finely powdered thioxanthone-sulfone-dicarboxylic acid is dispersed in 100 parts of orthodichlorobenzene and after adding 3 parts of thionylchloride the mixture is heated to boiling until the conversion into the thioxanthone-sulfone-dicarboxylic acid-dichloride is complete. The thionylchloride in excess is removed by distillation, a hot solution of 2.3 parts of 1-amino-5-benzoylamino-anthraquinone and 2 parts of anhydrous pyridine in 60 parts of orthodichlorobenzene is added and the whole is heated to boiling for 1 hour. The mixture is filtered after cooling, washed and dried. There is obtained a yellow-red powder which dyes cotton yellow tints from a black-violet vat.

The thioxanthone-sulfone-dicarboxylic acid used in this example has been obtained as follows:

3 parts of the thioxanthone-dicarboxylic acid described in Example 15 are dissolved in 100 parts of water containing 1.3 parts of caustic potash. 2.3 parts of potassium permanganate are then added to this solution and the whole is stirred for 20 hours at room temperature. The mixture is filtered, the clear filtrate is precipitated with hydrochloric acid, the residue separated by filtering and after drying thioxanthone-sulfone-dicarboxylic acid is obtained in the form of a grey-white powder which forms a yellow-brown, strongly green-fluorescent solution with concentrated sulfuric acid.

Example 17

2 parts of finely powdered diphenylene-dioxide-dicarboxylic acid are dispersed in 100 parts of orthodichlorobenzene and after adding 10 parts of thionylchloride the mixture is heated to 140–180° C. until the conversion into the diphenylene-dioxide-dicarboxylic acid dichloride is complete. The thionylchloride in excess is removed by distillation, a boiling solution of 5.5 parts of 1-amino-5-benzoylaminoanthraquinone in 100 parts of ortho-dichlorobenzene is added and the mixture is heated to boiling for about 1 hour. The whole is filtered after cooling, washed at first with ortho-dichlorobenzene, then with alcohol, and dried. There is obtained a brown-red powder which is vatted with violet-brown color and dyes cotton pure yellow tints of very good fastness.

When using 1-aminoanthraquinone instead of 1-amino-5-benzoylamino-anthraquinone, there is obtained a yellow powder which dyes cotton greenish-tinged yellow tints from a violet vat.

A yellow dyestuff is also obtained by condensing 1 mol of diphenylene-dioxide-monocarboxylic acid (obtainable by mono-nitrating diphenylene-dioxide, reducing, diazotizing of the mono-amino-diphenylenedioxide, reacting the dioza compound with cuprous cyanide according to Sandmeyer and saponifying the nitrile thus formed) with 1 mol of 1-aminoanthraquinone.

The diphenylenedioxide-dicarboxylic acid used has been obtained as follows:

36.8 parts of diphenylenedioxide of the formula

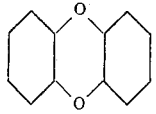

are dispersed in 120 parts of nitrobenzene. 67 parts of bromine are added in drops to this solution at room temperature, the whole is stirred until the evolution of hydrogen bromide which at first was very strong, has ceased, then filtered, washed at first with nitrobenzene, then with alcohol, and dried. There is obtained a product which crystallizes from chlorobenzene in colorless needles and melts at 145–150° C. The analysis shows it to be a dibromodiphenylene-dioxide.

20 parts of the dibromodiphenylene-dioxide described in the preceding paragraph are dispersed with 11 parts of cuprocyanide in 100 parts of anhydrous pyridine and the whole is heated under pressure for 6 hours at 250–255° C. The mixture is filtered after cooling, washed at first with pyridine, then with alcohol and dried. In order to remove copper compounds the crude product is boiled up for a short time with nitric acid of 30 percent strength, then filtered and washed with water. There is obtained a brownish product which is recrystallized from nitrobenzene and melts at 285–290° C. The analysis shows it to be a diphenplenedioxide-dinitrile.

7.7 parts of the diphenylenedioxide-dinitrile described in the foregoing paragraph are dispersed with 4 parts of caustic potash in 500 parts of alcohol of 96 percent strength and the whole is heated in an autoclave for 8 hours to 180–185° C. The alcohol is then distilled as completely as possible, the residue is dissolved in water, boiled with some animal charcoal and filtered. The clear solution is heated to boiling and mixed with hydrochloric acid until the reaction is acid to Congo. The diphenylenedioxide-dicarboxylic acid thus precipitated is filtered after cooling, washed with water and dried. There is obtained a yellowish-white, very sparingly soluble powder.

*Example 18*

2 parts of finely powdered xanthone-2:7-dicarboxylic acid are dispersed in 100 parts of ortho-dichlorobenzene and after adding 10 parts of thionylchloride the mixture is heated to 140–180° C. until the conversion into the xanthone-2:7-dicarboxylic acid-dichloride is complete. The thionylchloride in excess is removed by distillation, a boiling solution of 4.8 parts of 1-amino-5-benzoylamino-anthraquinone in 80 parts of ortho-dichlorobenzene is added and the mixture is heated for 1 hour to boiling. The whole is filtered after cooling, washed at first with ortho-dichlorobenzene, then with alcohol, and dried. There is obtained a yellow-red powder which dyes cotton fast yellow tints from a black-brown vat.

The xanthone-2:7-dicarboxylic acid used has been obtained as follows:

7 parts of dibromoxanthone (produced according to A. G. Perkin, Journal of the Chemical Society of London, vol 43, page 193) are dispersed with 4 parts of cuprocyanide in 80 parts of anhydrous quinoline and the whole is heated to boiling for 2 hours. The mixture is filtered after cooling, washed at first with quinoline, then with alcohol and dried. For the purpose of purification the crude produce is boiled for a short time with nitric acid of 30 percent strength, filtered, washed with water and dried. The xanthone-2:7-dinitrile thus obtained can be recrystallized from nitrobenzene.

12 parts of the xanthone-2:7-dinitrile described in the foregoing paragraph are dispersed with 6 parts of caustic potash in 1000 parts of alcohol of 90 percent strength and the dispersion is heated in an autoclave for 12 hours at 180–185° C. The alcohol is removed by distillation, the residue is dissolved in water, boiled up with some animal charcoal and filtered. The clear solution is then heated to boiling and mixed with hydrochloric acid until the reaction is acid to Congo. The thus precipitated xanthone-2:7-dicarboxylic acid is filtered after cooling, washed with water and dried. There is obtained a white powder which is very sparingly soluble.

*Example 19*

2.9 parts of 1:2-benzoxanthone-8-carboxylic acid (produced according to Rieche and Jungholt, Berichte der deutschen chem. Ges., vol 64, page 587) are dispersed in 200 parts of ortho-dichlorobenzene and after adding 10 parts of thionylchloride the mixture is heated to boiling until the conversion into the 1:2-benzoxanthone-8-carboxylic acid chloride is complete. After removing the thionylchloride in excess by distillation a boiling solution of 3.6 parts of 1-amino-5-benzoylaminoanthraquinone is added and the mixture is heated to boiling for 1 hour. It is filtered after cooling, washed at first with ortho-dichlorobenzene, then with alcohol, and dried. There is obtained a dyestuff in the form of yellow-red laminae, which dissolves in concentrated sulfuric acid to a red solution and dyes cotton yellow tints from a violet-brown vat.

*Example 20*

2.9 parts of 1:2-benzoxathone-8-carboxylic acid are dispersed in 60 parts of ortho-dichlorobenzene and after adding 5 parts of thionylchloride the mixture is heated to boiling until the conversion into the 1:2-benzoxanthone-8-carboxylic acid chloride is complete. After removing the thionylchloride in excess by distillation a boiling solution of 2.3 parts of 1-aminoanthraquinone in 80 parts of ortho-dichlorobenzene is added and the mixture is heated to boiling for 1 hour. It is filtered after cooling, washed at first with ortho-dichlorobenzene, then with alcohol, and dried. There is obtained a yellow-brown powder which dyes cotton green-yellow tints from a red vat.

*Example 21*

1 part of the dyestuff obtained according to Example 1 (cf. 1st paragraph) is dispersed in 100 parts of water with addition of 4 parts by volume of caustic soda solution of 36° Bé. and the solution is vatted at about 50° C. by addition of 2 parts of sodium hydrosulfite. This stock vat is added to a dye-bath which contains in 2000 parts of water 8 parts by volume of caustic soda solution of 36° Bé. and 1 part of sodium hydrosulfite. 100 parts of cotton are entered into this bath at 40° C., 30 parts of common salt are added after 15 minutes and dyeing is continued at 40-45° C. for further 45 minutes. The cotton is then squeezed, oxidized in the air, rinsed, acidified, in the usual manner, rinsed and saponified at the boil. The cotton is dyed fast yellow tints.

What we claim is:

1. Compounds of the general formula

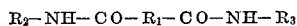

wherein $R_1$ stands for a thianthrene radical, and $R_2$ and $R_3$ stand for anthraquinone radicals.

2. Compounds of the general formula

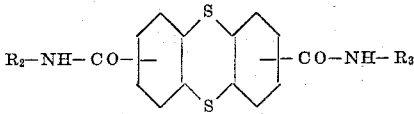

wherein $R_2$ and $R_3$ stand for anthraquinone radicals.

3. The compound of the formula

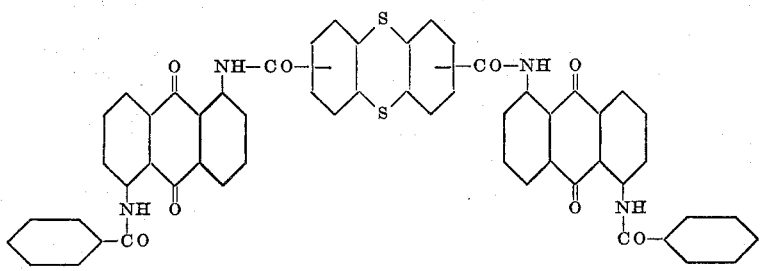

WALTER KERN.
PAUL SUTTER.
RICHARD TOBLER.